US012389928B1

(12) United States Patent
Zimmerman et al.

(10) Patent No.: US 12,389,928 B1
(45) Date of Patent: Aug. 19, 2025

(54) FLAVOR-CHANGING PRODUCT

(71) Applicant: McCormick & Company, Inc., Hunt Valley, MD (US)

(72) Inventors: Molly Zimmerman, Hunt Valley, MD (US); Jason Mittelheuser, Hunt Valley, MD (US)

(73) Assignee: McCormick & Company, Inc., Hunt Valley, MD (US)

( * ) Notice: Subject to any disclaimer, the term of this patent is extended or adjusted under 35 U.S.C. 154(b) by 0 days.

(21) Appl. No.: 18/926,935

(22) Filed: Oct. 25, 2024

(51) Int. Cl.
| A23G 3/00 | (2006.01) |
| A23L 27/12 | (2016.01) |
| A23L 27/20 | (2016.01) |
| A23P 10/40 | (2016.01) |

(52) U.S. Cl.
CPC ............... *A23L 27/12* (2016.08); *A23L 27/20* (2016.08); *A23P 10/40* (2016.08)

(58) Field of Classification Search
CPC ........... A23L 27/12; A23L 27/20; A23P 10/40
USPC .......................................................... 426/534
See application file for complete search history.

(56) References Cited

U.S. PATENT DOCUMENTS

| 2005/0118306 A1 | 6/2005 | Ludwig et al. |
| 2007/0098779 A1 | 5/2007 | Hanzen et al. |
| 2012/0040050 A1 | 2/2012 | Lenzi et al. |
| 2012/0171296 A1 | 7/2012 | Ookawa et al. |
| 2019/0008202 A1 | 1/2019 | Zasypkin et al. |

FOREIGN PATENT DOCUMENTS

| CA | 2891365 A1 * | 5/2014 | ........... A61K 31/137 |
| WO | WO 2021/051105 | 3/2021 | |
| WO | WO-2024086311 A1 * | 4/2024 | ............. A23L 27/72 |

OTHER PUBLICATIONS

International Search Report and Written Opinion issued in corresponding PCT Application No. PCT/US2024/052963, dated Feb. 26, 2025.
International Search Report and Written Opinion issued in corresponding PCT Application No. PCT/US2024/052955, dated Jan. 16, 2025.

* cited by examiner

*Primary Examiner* — Brent T O'Hern
(74) *Attorney, Agent, or Firm* — Norton Rose Fulbright US LLP

(57) ABSTRACT

The present disclosure provides flavored compositions including flavored particulate materials having different solubilities or dissolution rates and food and beverage compositions, including flavor-changing food and beverage products, comprising the flavored compositions.

14 Claims, 3 Drawing Sheets

FLAVOR-CHANGING PRODUCT

BACKGROUND OF THE INVENTION

I. Field of the Disclosure

The present disclosure relates to flavored particulate materials having differing dissolution rates and flavor-changing food and beverage products comprising the flavored particulate materials having differing dissolution rates.

II. Background

Novelty is important in the consumer food and beverage industry because it drives consumer interest, encourages trial of new products, and helps brands stand out in a competitive market by offering unique experiences, particularly among younger generations who actively seek out new flavors and concepts. Key advantages of novel foods and beverages include consumer demand, market differentiation, increased sales and revenue, and innovation and market growth. For example, younger demographics are particularly drawn to novelty, actively seeking out new and exciting food and beverage options, making it a critical factor in attracting this consumer base. Novelty can also generate buzz and excitement around a product, leading to increased consumer interest, trial, and ultimately, higher sales, which can help brands to differentiate themselves from competitors and capture a unique market niche.

Flavor is an important component that impacts the quality and acceptability of foods, and flavor-changing foods and beverages are one way to introduce novelty into the food and beverage industry. Flavor-changing foods and beverages can refer to products that experience a noticeable shift in flavor or taste during consumption and can be achieved using ingredients that react to saliva, temperature changes, or other stimuli to create a dynamic flavor experience. Methods of introducing flavor changes in these foods and beverages are known, and some examples include pH-sensitive flavors that change taste based on the acidity level in the mouth, like candies that start sour and then become sweet when saliva neutralizes the acidity, temperature-activated flavors that become more pronounced when heated or chilled, like beverages with hidden flavors that reveal themselves as the drink warms up, and encapsulated flavors in which a coating is used to encapsulated flavors including coated flavor molecules that allow for controlled release of taste throughout consumption.

However, adequately formulating flavor-changing foods and beverages has been challenging. Different ingredients can interact unexpectedly, which can alter the final flavor profile, and modifying flavors can sometimes negatively affect the desired mouthfeel of a food product. Maintaining a consistent flavor profile across production batches has also been difficult, especially because most flavor substances are low molecular mass volatile compounds, and direct handling and control during processing and storage are made difficult due to susceptibility to evaporation, and poor stability in the presence of air, light, moisture, and heat. Complex flavoring systems like encapsulated flavors have been developed to address this issue, where encapsulation provides the flavor in an easily metered and controlled release form. However, flavor encapsulation remains challenging because flavor substances can diffuse through the encapsulation matrix and participate in chemical and non-chemical interactions that lead to flavor bleeding or off-flavors, which can have negative effects on food acceptability and ingredient functionality.

Thus, there remains a need in the food and beverage industry for novel, optimized flavor-changing technologies that maintain a consistent flavor profile and do not negatively impact food acceptability and ingredient functionality.

SUMMARY

This disclosure describes a solution to at least some of the problems associated with flavor-changing food and beverage products. The solution resides in the use of flavored particulate materials having differing dissolution rates and flavor-changing food and beverage products comprising the flavored particulate materials having dissolution rates. The flavored particulate materials can be characterized by different matrices that encapsulate the flavor. The different matrices can comprise components having differing solubilities and therefore different dissolution rates to provide the differing dissolution rates of the flavored particulate materials. For example, a flavor-changing food and beverage product can include two or more of a particulate material comprising a high solubility matrix, a particulate material comprising a medium or moderate solubility matrix, and a particulate material comprising a low solubility matrix; the particulate material comprising the high solubility matrix will have a greater or faster dissolution rate than the particulate material comprising a medium or moderate solubility matrix and the particulate material comprising a low solubility matrix, and the particulate material comprising a low solubility matrix will have a lesser or slower dissolution rate than the particulate material comprising a high solubility matrix and the particulate material comprising a medium or moderate solubility matrix.

The flavored particulate materials having differing dissolution rates and flavor-changing food and beverage products comprising the flavored particulate materials provide several advantages over existing flavor-changing food and beverage technologies. For example, non-limiting advantages of separating flavors into different particulate materials having different dissolution rates according to the present disclosure include reducing unexpected ingredient interactions and undesirable flavor profiles and reducing production batch inconsistency to maintain consistent flavor profiles across production batches. Diffusion of flavor through the different matrices of the present flavored particulate materials can also be minimized, which can reduce flavor bleed in the food and beverage compositions. Additionally, particle size and shape as well as modifications that can be made to the solubility and dissolution rate of the different matrices can help to fine tune the timing of flavor changes in foods and beverages including the flavored particulate materials. In some aspects, 1, 2, 3, 4, or more flavor changes can be introduced into foods and beverages by using the flavored particulate materials. Accordingly, in some aspects, the flavored particulate materials of the present disclosure can improve food and beverage acceptability and ingredient functionality.

Accordingly, some aspects of the disclosure are directed to a flavored composition comprising two or more of: a first plurality of particles having a first solubility or dissolution rate, a second plurality of particles having a second solubility or dissolution rate, and a third plurality of particles having a third solubility or dissolution rate. In some aspects, the flavored composition is comprised in a food or beverage.

In some aspects, each of the first particles of the flavored composition comprise: (a) a first matrix comprising one or more hydrocolloids and one or more sugars; and (b) a first flavoring agent. In some aspects, the first matrix comprises 30-50 wt. % of a fast-dissolving hydrocolloid and 40-60 wt. % of a sugar having a moderate dissolution rate. In some aspects, the first matrix of the first particles defines at least a portion of the outer surface of each of the first particles. In some aspects, the first flavoring agent is uniformly dispersed in the first matrix. In some aspects, each of the first particles is homogenous or unlayered. In some aspects, the first particles provide a first flavor to the composition.

In some aspects, the dissolution rate of the first plurality of particles is higher than the dissolution rate of the second plurality of particles. In some aspects, the dissolution rate of the one or more hydrocolloids of the first matrix is higher than the dissolution rate of the one or more hydrocolloids of the second matrix and the one or more hydrocolloids of the third matrix. In some aspects, the dissolution rate of the one or more sugars of the first matrix is higher than the dissolution rate of the one or more sugars of the second matrix and the one or more sugars of the third matrix.

In some aspects, each of the second particles of the flavored composition comprise: (a) a second matrix comprising one or more hydrocolloids and one or more sugars; and (b) a second flavoring agent. In some aspects, the second matrix comprises 30-50 wt. % of a slow-dissolving hydrocolloid, 15-35 wt. % of a hydrocolloid having a moderate dissolution rate, and 10-30 wt. % of a sugar having a moderate dissolution rate. In some aspects, the second matrix of the second particles defines at least a portion of the outer surface of each of the second particles. In some aspects, the second flavoring agent is uniformly dispersed in the second matrix. In some aspects, each of the second particles is homogenous or unlayered. In some aspects, the second particles provide a second flavor to the composition that is different from the first flavor provided by the first particles.

In some aspects, the dissolution rate of the one or more hydrocolloids of the second matrix is lower than the dissolution rate of the one or more hydrocolloids of the first matrix and the one or more hydrocolloids of the third matrix. In some aspects, the dissolution rate of the one or more sugars of the second matrix is lower than the dissolution rate of the one or more sugars of the first matrix and the one or more sugars of the third matrix.

In some aspects, each of the third particles of the flavored composition comprise: (a) a third matrix comprising one or more hydrocolloids and one or more sugars; and (b) a third flavoring agent. In some aspects, the third matrix comprises 65-85 wt. % a hydrocolloid having a moderate dissolution rate and 1-20 wt. % of a fast-dissolving sugar. In some aspects, the third matrix of the third particles defines at least a portion of the outer surface of each of the third particles. In some aspects, the third flavoring agent is uniformly dispersed in the third matrix. In some aspects, each of the third particles is homogenous or unlayered. In some aspects, the third particles provide a third flavor to the composition that is different from the flavor provided by the first particles and the flavor provided by the third particles.

In some aspects, the dissolution rate of the third plurality of particles is lower than the dissolution rate of the first plurality of particles and higher than the dissolution rate of the second plurality of particles. In some aspects, the dissolution rate of the one or more hydrocolloids of the third matrix is lower than the dissolution rate of the one or more hydrocolloids of the first matrix and higher than the dissolution rate of the one or more hydrocolloids of the second matrix. In some aspects, the dissolution rate of the one or more sugars of the third matrix is lower than the dissolution rate of the one or more sugars of the first matrix and higher than the dissolution rate of the one or more sugars of the second matrix.

In specific aspects, the flavored composition comprises two or more of the first plurality of particles, the second plurality of particles, and the third plurality of particles. Each of the first particles can comprise: (a) the first matrix comprising 30-50 wt. % of a fast-dissolving starch and 40-60 wt. % sucrose; and (b) the first flavoring agent. The first matrix can define at least a portion of the outer surface of each of the first particles. Each of the second particles can comprise: (a) the second matrix comprising 30-50 wt. % a slow-dissolving starch, 15-35 wt. % of a starch having a moderate dissolution rate, 10-30 wt. % trehalose, and 1-10 wt. % insoluble fiber; and (b) the second flavoring agent. The second matrix can define at least a portion of the outer surface of each of the second particles. Each of the third plurality of particles can comprise: (a) the third matrix comprising 65-85 wt. % of a starch having a moderate dissolution rate, 1-20 wt. % dextrose, and 1-10 wt. % insoluble fiber; and (b) the third flavoring agent. The third matrix can define at least a portion of the outer surface of each of the third particles. The dissolution rate of the first plurality of particles can be higher than the dissolution rate of the second plurality of particles, and the dissolution rate of the third plurality of particles can be lower than the dissolution rate of the first plurality of particles and higher than the dissolution rate of the second plurality of particles.

In some aspects, the first matrix further comprises one or more insoluble fibers. In some aspects, the second matrix further comprises one or more insoluble fibers. In some aspects, the second matrix further comprises 1-10 wt. % of one or more insoluble fibers. In some aspects, the third matrix further comprises one or more insoluble fibers. In some aspects, the third matrix further comprises 1-10 wt. % of one or more insoluble fibers. In some aspects, the one or more insoluble fibers of the first matrix, the second matrix, and/or the third matrix are sugarcane fiber, apple fiber, blueberry fiber, citrus fiber, oat fiber, wood fiber, cellulose fiber, cotton fiber, rice fiber, wheat fiber, or a combination thereof.

In some aspects, each of the first, second, and third flavoring agents are oil soluble. In some aspects, each of the first, second, and third flavoring agents are a natural extract, oleoresin, essential oil, protein hydrolyzate, reaction flavor, compounded flavor, or a mixture thereof.

Also disclosed herein, in some aspects, is a method of making a flavored composition disclosed herein. The method can comprise forming a plurality of first particles, e.g., any of the pluralities of first particles disclosed herein, by mixing, melting, and extruding: (a) a first matrix having a first solubility or dissolution rate, the first matrix comprising one or more hydrocolloids and one or more sugars; and (b) a first flavoring agent. The matrix can define at least a portion of the outer surface of each of the first particles. The method can further comprise forming a plurality of second particles, e.g., any of the pluralities of second particles disclosed herein, by mixing, melting, and extruding: (a) a second matrix having a second solubility or dissolution rate, the second matrix comprising one or more hydrocolloids and one or more sugars; and (b) a second flavoring agent. The second matrix can define at least a portion of the outer surface of each of the second particles. The method can further comprise combining the first particles and the second particles to provide the flavored composition.

In some aspects, the method further comprises forming a plurality of third particles, e.g., any of the pluralities of third particles disclosed herein, by mixing, melting, and extruding: (a) a third matrix having a third solubility or dissolution rate, the third matrix comprising one or more hydrocolloids and one or more sugars; and (b) a third flavoring agent. The third matrix can define at least a portion of the outer surface of each of the third particles. The method can further comprise combining the third particles with the first particles and the second particles to provide the flavored composition.

Also disclosed herein, in some aspects, is a method of providing a sequential change in flavor of a food or beverage product including the flavored compositions disclosed herein. In some aspects, the food or beverage product is a powder, a paste, a liquid, a solid, a semi-solid, a purée, a chew, or a candy. The method can comprise contacting two or more of a plurality of first particles, a plurality of second particles, and a plurality of third particles, e.g., any of the pluralities of first, second, and/or third particles disclosed herein, with an aqueous solution. Each of the first particles can comprise: (a) a first matrix comprising one or more hydrocolloids and one or more sugars; and (b) a first flavoring agent. The first matrix can define at least a portion of the outer surface of each of the first particles. Each of the second particles can comprise (a) a second matrix comprising one or more hydrocolloids and one or more sugars; and (b) a second flavoring agent. The second matrix can define at least a portion of the outer surface of each of the second particles. Each of the third particles can comprise: (a) a third matrix comprising one or more hydrocolloids and one or more sugars; and (b) a third flavoring agent. The third matrix can define at least a portion of the outer surface of each of the third particles. The method can further comprise dissolving the two or more of the plurality of first particles, the plurality of second particles, and the plurality of third particles in the aqueous solution. In some aspects, dissolution of the plurality of first particles provides a first flavor to the food or beverage product, dissolution of the plurality of second particles provides a second flavor to the food or beverage product, and dissolution of the plurality of third particles provides a third flavor to the food or beverage product.

In some aspects, a time between dissolution of each of the two or more of the plurality of first particles, the plurality of second particles, and the plurality of third particles is between 5 seconds (sec) and 30 minutes (min), e.g., at least, at most, exactly, or between any two of 5 sec, 10 sec, 15 sec, 20 sec, 25 sec, 30 sec, 35 sec, 40 sec, 45 sec, 50 sec, 55 sec, 60 sec, 2 min, 4 min, 6 min, 8 min, 10 min, 12 min, 14 min, 16 min, 18 min, 20 min, 22 min, 24 min, 26 min, 28 min, or 30 min. In some aspects, the dissolution rate of the plurality of first particles is higher than the dissolution rate of the plurality of second particles. In some aspects, the dissolution rate of the plurality of third particles is lower than the dissolution rate of the plurality of first particles and higher than the dissolution rate of the plurality of second particles. In some aspects, the dissolution rate of the one or more hydrocolloids of the first matrix is higher than the dissolution rate of the one or more hydrocolloids of the second matrix and the one or more hydrocolloids of the third matrix, and the dissolution rate of the one or more sugars of the first matrix is higher than the dissolution rate of the one or more sugars of the second matrix and the one or more sugars of the third matrix. In some aspects, the dissolution rate of the one or more hydrocolloids of the second matrix is lower than the dissolution rate of the one or more hydrocolloids of the first matrix and the one or more hydrocolloids of the third matrix, and the dissolution rate of the one or more sugars of the second matrix is lower than the dissolution rate of the one or more sugars of the first matrix and the one or more sugars of the third matrix. In some aspects, the dissolution rate of the one or more hydrocolloids of the third matrix is lower than the dissolution rate of the one or more hydrocolloids of the first matrix and higher than the dissolution rate of the one or more hydrocolloids of the second matrix, and the dissolution rate of the one or more sugars of the third matrix is lower than the dissolution rate of the one or more sugars of the first matrix and higher than the dissolution rate of the one or more sugars of the second matrix.

The claims are not intended to include, and should not be interpreted to include, means plus- or step-plus-function limitations, unless such a limitation is explicitly recited in a given claim using the phrase(s) "means for" or "step for," respectively.

The use of the term "or" in the claims is used to mean "and/or" unless explicitly indicated to refer to alternatives only or the alternative are mutually exclusive, although the disclosure supports a definition that refers to only alternatives and "and/or." The phrase "and/or" means "and" or "or". To illustrate, A, B, and/or C includes: A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, the compositions and methods of the present disclosure that "comprise," "have," "include" or "contain" one or more elements possesses those one or more elements, but are not limited to possessing only those one or more elements. Likewise, an element of a composition or method of the present disclosure that "comprises," "has," "includes" or "contains" one or more features possesses those one or more features, but is not limited to possessing only those one or more features.

Any embodiment of the compositions and methods of the present disclosure can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb. Compositions and methods "consisting essentially of" any of the elements or steps disclosed limits the scope of the claim to the specified materials or steps which do not materially affect the basic and novel characteristic of the claimed disclosure. The words "consisting of" (and any form of consisting of, such as "consist of" and "consists of") means including, and limited to, whatever follows the phrase "consisting of" Thus, the phrase "consisting of" indicates that the listed elements are required or mandatory, and that no other elements may be present.

As used herein, in the specification, "a" or "an" may mean one or more, unless clearly indicated otherwise. As used herein, in the claim(s), when used in conjunction with the word "comprising," the words "a" or "an" may mean one or more than one. As used herein "another" may mean at least a second or more.

In any disclosed aspect, the terms "about" and "approximately" and "substantially" and the like may be substituted with "within [a percentage] of" what is specified. In one non-limiting aspect, the percentage includes 0.1, 0.5, 1, 5, and 10 percent.

A composition disclosed herein may be considered "substantially free" of a substance when the amount of the substance is not sufficient to materially affect the structural, functional, or chemical properties of the composition. Additionally, or alternatively, a composition disclosed herein may be considered "substantially free" of a substance when the concentration of the substance in the composition is less than 0.1 wt. %.

As used herein, unless the surrounding text explicitly indicates a contrary intention, all values given in the form of percentages are weight per weight (w/w), weight percent, or wt. %, corresponding to the proportion of a particular substance within a mixture, as measured by weight or mass.

"Ambient temperature" and "room temperature" can each include a temperature of 15° C. to 30° C., or any range or value derivable therein. In some aspects, ambient or room temperature can include a temperature of 15° C. to 25° C., 20° C. to 25° C., 18° C. to 28° C., or any range or value derivable therein. In certain aspects, ambient or room temperature includes 25° C.

As used herein, the "solubility" of a substance, e.g., a particle matrix or components thereof as disclosed herein, is the maximum amount of the substance that will dissolve in a defined volume or mass of a solvent at a given temperature. Solubility is typically reported in moles per unit volume of solvent, moles per unit mass of solvent, mass of substance per unit volume of solvent, or mass of substance per unit mass of solvent. As used herein, the dissolution rate is the rate at which a substance, e.g., a particle matrix or components thereof as disclosed herein, dissolves in an aqueous-based, alcohol-based, or other suitable liquid solvent. Mathematically, the Noyes-Nernst equation, also known as the Noyes-Whitney equation describes the dissolution rate of a substance in a solvent. The dissolution rate of the substance is directly proportional to the surface area of the substance, i.e., particles with larger surface areas will dissolve faster than particles with smaller surface areas, and the dissolution rate of a substance may be increased by increasing the surface area. According to the modified Noyes-Whitney equation, the dissolution rate is proportional to both solubility and surface area and is expressed mathematically as:

$$\frac{dC}{dt} = \frac{D*A*(Cs-C)}{hv}$$

where D is the diffusion coefficient in the dissolution medium; h is the thickness of the substance; A is the surface area of the substance; v is the volume of solvent; Cs is the concentration of the substance at saturated solution; and C is the concentration of the substance at particular time, t. Variables including solvent temperature, agitation, pH, and the presence and concentration of other solutes within the solvent can also affect the solubility of a substance and therefore can affect the rate at which the substance dissolves. Unless stated otherwise, the dissolution rates herein are the rate at which a substance, e.g., a particle matrix or components thereof as disclosed herein, dissolves in water at room temperature, without agitation, at neutral pH.

The term "flavoring agent" or "flavorant" refers to a substance that is added to a food or beverage product to provide or change a flavor of the food or beverage. A flavoring agent may be a therapeutically inert, nonallergenic substance comprising inactive ingredients and may be encapsulated in a matrix, as disclosed herein. The flavoring agent may be an oil, aqueous solution, non-aqueous solution, or an emulsion. The term "flavor" refers to the blend of taste and smell sensations evoked by a substance in the mouth. Taste and smell sensations can include salt, sweet, sour, bitter, umami, fat, and heat. The flavoring agent may be an artificial flavor, a natural flavor, or spice. As used herein, "artificial flavor" refers any substance used to impart flavor that is not derived from a spice, fruit or fruit juice, vegetable or vegetable juice, edible yeast, herb, bark, bud, root, leaf or similar plant material, meat, fish, poultry, eggs, dairy products, or fermentation products thereof. As used herein "spice" refers to any aromatic vegetable substance, including herbs or similar plant material, in whole, broken, or ground form whose significant function in food is seasoning rather than nutritional; in some aspects, no or substantially no portion of any volatile oil or other flavoring principle has been removed from the spice. As used herein, a "natural flavor" refers to an essential oil, oleoresin, essence or extractive, protein hydrolysate, distillate, or any product of roasting, heating, or enzymolysis, which contains the flavoring constituents derived from a spice, fruit or fruit juice, vegetable or vegetable juice, edible yeast, herb, bark, bud, root, leaf or similar plant material, meat, seafood, poultry, eggs, dairy products, or fermentation products thereof whose significant function in food is flavoring rather than nutritional. Flavor essences, i.e., the water-soluble fraction derived from fruit or citrus, can also be utilized. Any flavor that changes the taste or smell of a food or beverage or the blend of tastes and smells evoked by a food or beverage is contemplated for use as a flavoring agent in the flavored compositions disclosed herein.

The terms "food," "beverage," "food product," "beverage product," and the like mean a product or composition that is intended for ingestion by an animal, including a human. The present disclosure is not limited to a specific animal.

Any method in the context of a purpose or effect in consumers may also be described in "use" claim language such as "Use of" any compound, composition, or agent discussed herein for achieving or implementing a described flavoring effect.

It is specifically contemplated that any limitation discussed with respect to one aspect of the disclosure may apply to any other aspect of the disclosure. Furthermore, any composition of the disclosure may be used in any method of the disclosure, and any method of the disclosure may be used to produce or to utilize any composition of the disclosure. Any embodiment discussed with respect to one aspect of the disclosure applies to other aspects of the disclosure as well and vice versa. For example, any step in a method described herein can apply to any other method. Moreover, any method described herein may have an exclusion of any step or combination of steps. Aspects of an embodiment set forth in the Examples are also aspects that may be implemented in the context of embodiments discussed elsewhere in a different Example or elsewhere in the application, such as in the Summary, Detailed Description, Claims, and Brief Description of the Drawings.

Other objects, features, and advantages of the present disclosure will become apparent from the following detailed description. It should be understood, however, that the detailed description and the examples, while indicating specific aspects of the disclosure, are given by way of illustration only. Additionally, it is contemplated that changes and modifications within the spirit and scope of the disclosure will become apparent to those skilled in the art from this detailed description.

BRIEF DESCRIPTION OF THE DRAWINGS

Various features and advantageous details are explained more fully with reference to the non-limiting aspects illustrated in the accompanying drawings and detailed in the following description. It should be understood, however, that the detailed description and the specific examples, while indicating aspects of the disclosure, are given by way of illustration only, and not by way of limitation. Various substitutions, modifications, additions, and/or rearrangements will become apparent to those of ordinary skill in the art from this disclosure.

DETAILED DESCRIPTION

Figure 1:
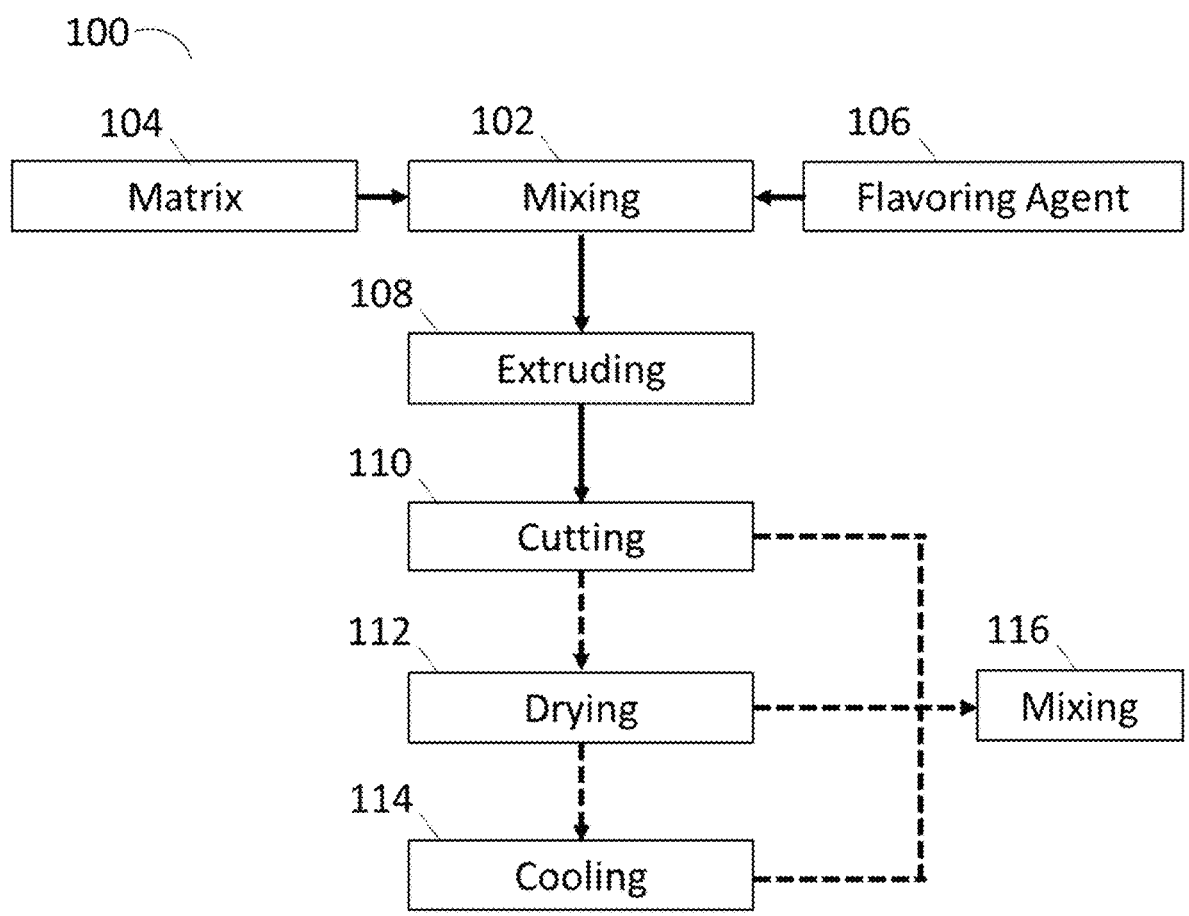
FIG. 1 is a diagram outlining exemplary method steps employed in the production of a flavored composition as disclosed herein.

As noted above, the present disclosure describes flavored particulate materials having differing solubilities or dissolution rate and improved flavor-changing food and beverage products comprising the flavored particulate materials. In some aspects, food and beverage products formulated with the flavored particulate materials having differing solubilities or dissolution rate provide advantages over existing food and beverage products formulated with flavor-changing components not characterized by different flavor encapsulation matrices. Such advantages can include, for example, consistent flavor profiles with substantially no unexpected and undesirable ingredient interactions or flavor bleed. The flavored particulate materials can impart unique and entertaining flavor change effects in food and beverage products when exposed to an aqueous environment. For example, the flavored particulate materials might, when exposed to an aqueous environment, provide a first flavor followed by a second, distinct flavor, and the second flavor may be followed by a third flavor that is distinct from both the first and second flavors. Having a multitude of differently flavored particulate materials with different dissolutions rates can provide an economical means of controlled and sustained release in comparison to other approaches to flavor-changing foods and beverages. Such sequential changes in food and beverage products can provide a novel effect desirable to consumers.

I. Flavored Compositions

Disclosed herein, in some aspects, are flavored compositions including flavored particulate materials having differing dissolution rates and flavor-changing food and beverage products comprising the flavored particulate materials having differing dissolution rates. The flavored particulate materials can be characterized by different matrices that encapsulate the flavor. The different matrices can comprise components having differing solubilities and therefore different dissolution rates to provide the differing dissolution rates of the flavored particulate materials. The particulate materials can include a plurality of particles, where each particle in the plurality includes a matrix and a flavoring agent.

Each of the particles of each plurality can have a diameter of about 0.1 to about 5 mm, e.g., at least, at most, exactly, or between any two of 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, or 5 mm. Particle size and shape have an effect on particle solubility or dissolution rate, flavor release, caking, and flavor stability. Particle size can be modified according to desired flavor release or dissolution rates, e.g., smaller particles dissolve faster than larger particles, but particles should not be so large as to result in a gritty mouthfeel from residual undissolved particles when added to a solvent as recommended. In some aspects, particles in one plurality of particles are different in size than particles in one or more other pluralities of particles. In some aspects, particles in one plurality of particles are the same size as particles in each of the other pluralities of particles.

Generally, each of the particles of each plurality are spherical, but other shaped particles can be used if desired. Non-liming particle shapes include spherical particles, nearly spherical particles, half-sphere particles, rods, cylindrical particles, flakes, football-shaped particles, star-shaped particles, heart-shaped particles, crescent moon-shaped particles, and the like.

The particle size and shape distribution may be measured or evaluated in a number of ways known in the art, including but not limited to the following methods: direct measurement with a caliper, sieve analysis, light scattering methods, microscopy, optical projection methods accompanied with image analysis. The particle size distribution may be defined as a distribution of particles by their size, surface area, weight, volume, color, or any other characteristic of interest.

In one aspect, the width of the particle shape and size distribution is such that 90% of the particles by weight do not deviate in size from the mean value by more than 50% of the mean value. In another aspect, 90% of the particles by weight do not deviate in size from the mean value by more than 30% of the mean value. In yet another aspect, 90% of the particles by weight do not deviate in size from the mean value by more than 20% of the mean value. For example, if the mean particle size is 500 microns, and 90% of the particles by weight do not deviate in size from the mean value by more than 20% of the mean value, then 90% of the particles by weight would have a size between 400 and 600 microns. If the shape of the particles is not spherical then the same specification may be applied to each characteristic dimension of the particles. For example, if the particles are cylindrical rods, then 20% deviation is applied to each characteristic dimension, namely, to the length of the rods as well as to their diameter.

The environment in which the particles may be dispersed or dissolved can be aqueous-based, alcohol-based, or any other suitable liquid solvent for the ingredients. As used herein, the term water-soluble includes both water-soluble and water dispersible materials. The proportion of solvent proportion generally will be that sufficient to permit solubilization or dissolution of the ingredients and to provide the desired strength or dilution of the flavoring agents.

A. Matrices

At least a portion of the outer surface of each particle in each plurality of particles disclosed herein is defined by a matrix, where the matrix comprises edible, soluble materials (e.g., carbohydrates, gels, proteins, lipids, and the like). In some aspects, the materials used in the matrices are soluble or dispersible in a selected solvent and do not create a gritty mouthfeel or significantly affect the clarity of the food or beverage when such an effect on mouthfeel or clarity is not intended. In some aspects, the particle matrices comprise one or more food safe polymers, e.g., one or more hydrocolloids, and one or more sugars.

The flavored compositions can comprise one, two, three, or more pluralities of particles. Each plurality of particles can be characterized by a dissolution rate that is different from the dissolution rates of each of the other pluralities of particles. For example, in a flavored composition including a first plurality of particles, a second plurality of particles, and a third plurality of particles, the dissolution rate of a first plurality of particles can be higher than the dissolution rate of a second plurality of particles and a third plurality of particles, and the dissolution rate of the third plurality of particles can be lower than the dissolution rate of the first plurality of particles and higher than the dissolution rate of the second plurality of particles. Each plurality of particles can be characterized by a matrix that is different from the matrices of each of the other pluralities of particles, and the dissolution rate of each of the particles can be a function of the solubility of each of the particle matrix components and/or the size of the particles. In some aspects, fast-dissolving high solubility matrix components have a dissolution rate of at least, at most, exactly, or between any two of <1, 1, 5, 10, 15, 20, 25, 30, 35, 40, 45, 50, 55, or 60 seconds. In some aspects, matrix components having moderate solubility have a dissolution rate of at least, at most, exactly, or between any two of 1, 2, 3, 4, 5, 6, 7, 8, 9, or 10 minutes. In some aspects, slow-dissolving low solubility matrix components have a dissolution rate of at least, at most, exactly, or between any two of 5, 6, 7, 8, 9, 10, 11, 12, 13, 14, 15, 16, 17, 18, 19, 20, 21, 22, 23, 24, 25, 26, 27, 28, 29, or 30 minutes.

The particle matrices can include one or more food-safe polymers that dissolve in an aqueous environment, e.g., in water. The one or more food-safe polymers may be one or more hydrocolloids. The one or more hydrocolloids may be one or more starches, one or more gums, one or more maltodextrins, or a combination thereof. Non-limiting examples of hydrocolloids that may be used in the matrices disclosed herein include starch, modified starch, maltodextrin, cellulose, carboxymethyl cellulose, methylcellulose, hydroxypropyl methylcellulose, alginate, gelatin, or a combination thereof. Any one or more of the foregoing hydrocolloids may be excluded from the flavored compositions disclosed herein.

Starches are available from a variety of botanical sources, and native and modified forms of starches are contemplated for use in food products. The starches can be natural, non-processed starches, physically processed starches, or derivatives thereof. In some aspects, the one or more starches are corn starch, tapioca starch, pea starch, rice starch, potato starch, wheat starch, or any combination(s) or derivative(s) thereof. In specific aspects, the one or more starches are corn starches or tapioca starches. Any one or more of the foregoing starches may be excluded from the flavored compositions disclosed herein.

Maltodextrins are partially hydrolyzed forms of corn, rice, wheat, tapioca, or potato starches utilizing suitable acid and/or enzymatic hydrolysis. The maltodextrins are defined as having a Dextrose Equivalent (DE) of less or equal 20. Non-limiting examples of maltodextrins include the 5 DE, 6DE, 10 DE, 12DE, 15 DE, 16DE, 18 DE, and 19DE maltodextrins. DE characterizes average molecular weight of glucose oligomers by number. In practice, the maltodextrins have a distribution of glucose oligomers by molecular weight or DE value. Any one or more of the foregoing maltodextrins may be excluded from the flavored compositions disclosed herein.

Non-limiting examples of gums include xanthan gum, gum Arabic, guar gum, locust bean gum, tara gum, larch gum, Konjac glucomannan, gum tragacanth, agar, carrageenan, pectin, gellan gum, or a combination thereof. In specific aspects, the one or more gums are gum Arabic. Any one or more of the foregoing gums may be excluded from the flavored compositions disclosed herein.

In one aspect, a matrix of each particle in a first plurality of particles includes 30 wt. % to 50 wt. %, e.g., at least, at most, exactly, or between any two of 30, 32.5, 35, 37.5, 40, 42.5, 45, 47.5, and 50 wt. %, of one or more fast-dissolving high solubility food safe polymers, e.g., one or more monosaccharides, maltodextrins, or starches disclosed herein. In one aspect, a matrix of each particle in a second plurality of particles includes 30 wt. % to 50 wt. %, e.g., at least, at most, exactly, or between any two of 30, 32.5, 35, 37.5, 40, 42.5, 45, 47.5, and 50 wt. %, of one or more food safe polymers having a moderate dissolution rate, e.g., one or more starches or disaccharides disclosed herein. In one aspect, a matrix of each particle in a second plurality of particles includes 15 wt. % to 35 wt. %, e.g., at least, at most, exactly, or between any two of 15, 17.5, 20, 22.5, 25, 27.5, 30, 32.5, or 35 wt. %, of one or more slow-dissolving low solubility food safe polymers, e.g., one or more starches or gums disclosed herein. In one aspect, a matrix of each particle in a second plurality of particles includes 30 wt. % to 50 wt. %, e.g., at least, at most, exactly, or between any two of 30, 32.5, 35, 37.5, 40, 42.5, 45, 47.5, and 50 wt. %, of one or more food safe polymers having a moderate dissolution rate, e.g., one or more starches or disaccharides disclosed herein, and 15 wt. % to 35 wt. %, e.g., at least, at most, exactly, or between any two of 15, 17.5, 20, 22.5, 25, 27.5, 30, 32.5, or 35 wt. %, of one or more slow-dissolving low solubility food safe polymers, e.g., one or more starches or gums disclosed herein. In one aspect, a matrix of each particle in a third plurality of particles includes 65 wt. % to 85 wt. %, e.g., at least, at most, exactly, or between any two of 65, 67.5, 70, 72.5, 75, 77.5, 80, 82.5, or 85 wt. %, of one or more food safe polymer having a moderate dissolution rate, e.g., one or more starches or disaccharides disclosed herein.

In one aspect, a particle matrix includes 40 wt. % to 60 wt. %, e.g., at least, at most, exactly, or between any two of 40, 42.5, 45, 47.5, 50, 52.5, 55, 57.5, or 60 wt. %, of one or more slow-dissolving low solubility food safe polymers, e.g., one or more starches or gums disclosed herein. In one aspect, a particle matrix includes 0.1 wt. % to 10 wt. %, e.g., at least, at most, exactly, or between any two of 0.1, 1, 2, 3, 4, 5, 6, 7, 8, 9, or 10 wt. %, of one or more fast-dissolving food safe polymers, e.g., one or more monosaccharides, maltodextrins, or starches disclosed herein. In one aspect, a particle matrix includes 40 wt. % to 60 wt. %, e.g., at least, at most, exactly, or between any two of 40, 42.5, 45, 47.5, 50, 52.5, 55, 57.5, or 60 wt. %, of one or more slow-dissolving low solubility food safe polymers, e.g., one or more starches or gums disclosed herein, and 0.1 wt. % to 10 wt. %, e.g., at least, at most, exactly, or between any two of 0.1, 1, 2, 3, 4, 5, 6, 7, 8, 9, or 10 wt. %, of one or more fast dissolving food safe polymers, e.g., one or more monosaccharides, maltodextrins, or starches disclosed herein.

In some aspects, the combined wt. % of the one or more food safe polymers, e.g., one or more hydrocolloids, in the particle matrix can be 30-85 wt. %, e.g., at least, at most, exactly, or between any two of 30, 32.5, 35, 37.5, 40, 42.5, 45, 47.5, 50, 52.5, 55, 57.5, 60, 62.5, 65, 67.5, 70, 72.5, 75, 77.5, 80, 82.5, or 85 wt. %. In some aspects, the combined wt. % of the one or more food safe polymers, e.g., one or more hydrocolloids, in the particle matrix is 0.1-60 wt. %, e.g., at least, at most, exactly, or between any two of 0.1, 1, 2.5, 5, 7.5, 10, 12.5, 15, 17.5, 20, 22.5, 25, 27.5, 30, 32.5, 35, 37.5, 40, 42.5, 45, 47.5, 50, 52.5, 55, 57.5, or 60 wt. %.

The flavored compositions can comprise one, two, three, or more pluralities of particles, where the combination and/or concentration of the one or more food safe polymers, e.g., one or more hydrocolloids, of the particle matrix of one plurality of particles is different from the one or more food safe polymers, e.g., one or more hydrocolloids, of each of the other of the particle matrices of each of the other pluralities of particles, and where the different combinations and/or concentrations of the one or more food safe polymers, e.g., one or more hydrocolloids, results in each plurality of particles having a dissolution rate that is different from the dissolution rate of each of the other pluralities of particles. For example, in a flavored composition including a first plurality of particles, a second plurality of particles, and a third plurality of particles, the solubility or dissolution rate of the one or more food safe polymers, e.g., one or more hydrocolloids, of the particle matrix of the first plurality of particles can be higher than the solubility or dissolution rate of the one or more food safe polymers, e.g., one or more hydrocolloids, of the particle matrix of the second plurality of particles and the particle matrix of the third plurality of particles, resulting in the first plurality of particles having a solubility or dissolution rate that is faster than the solubility or dissolution rate of the second plurality of particles and the third plurality of particles. Further, the solubility or dissolution rate of the one or more food safe polymers, e.g., one or more hydrocolloids, of the particle matrix of the third plurality of particles can be lower than the solubility or dissolution rate of the one or more food safe polymers, e.g., one or more hydrocolloids, of the particle matrix of the first plurality of particles and higher than the solubility or dissolution rate of the one or more food safe polymers, e.g., one or more hydrocolloids, of the particle matrix of the second plurality of particles, resulting in the third plurality of particles having a solubility or dissolution rate that is faster than the solubility or dissolution rate of the second plurality of particles but slower than the first plurality of particles.

Accordingly, in some aspects, the dissolution rate of the one or more food safe polymers, e.g., one or more hydrocolloids, in the particle matrix of the first matrix is higher than the dissolution rate of the one or more food safe polymers, e.g., one or more hydrocolloids, of the second matrix and the one or more food safe polymers, e.g., one or more hydrocolloids, of the third matrix. In some aspects, the dissolution rate of the one or more food safe polymers, e.g., one or more hydrocolloids, of the second matrix is lower than the dissolution rate of the one or more food safe polymers, e.g., one or more hydrocolloids, of the first matrix and the one or more food safe polymers, e.g., one or more hydrocolloids, of the third matrix. In some aspects, the dissolution rate of the one or more food safe polymers, e.g., one or more hydrocolloids, of the third matrix is lower than the dissolution rate of the one or more food safe polymers, e.g., one or more hydrocolloids, of the first matrix and higher than the dissolution rate of the one or more food safe polymers, e.g., one or more hydrocolloids, of the second matrix.

The particle matrices can further include one or more sugars that dissolve in an aqueous environment, e.g., in water. The one or more sugars may be one or more monosaccharides, disaccharides, polysaccharides, other extracted carbohydrates, low molecular weight sugars or polyols, or a combination thereof. Non-limiting examples of monosaccharides that may be used in the matrices disclosed herein include fructose, glucose, dextrose, mannose, galactose, ribose, xylose, arabinose, gulose, lyxose, or a combination thereof. Non-limiting examples of disaccharides that may be used in the matrices disclosed herein include sucrose, maltose, trehalose, cellobiose, lactose, or a combination thereof. Non-limiting examples of polysaccharides that may be used in the matrices disclosed herein include dextrin, fructan, inulin, amylose cellulose, polydextrose, raffinose, or a combination thereof. Non-limiting examples of monosaccharides that may be used in the matrices disclosed herein include glycerin, propylene glycol, erythritol, maltitol, mannitol, xylitol, sorbitol, lactitol, isomalt, dulcitol, hydrogenated corn syrups, hydrogenated glucose syrups, hydrogenated maltose syrups, hydrogenated lactose syrups, or a combination thereof. In specific aspects, the one or more sugars are sucrose, dextrose, or trehalose. Any one or more of the foregoing sugars may be excluded from the flavored compositions disclosed herein.

In one aspect, a matrix of each particle in a first plurality of particles includes 40 wt. % to 60 wt. %, e.g., at least, at most, exactly, or between any two of 40, 42.5, 45, 47.5, 50, 52.5, 55, 57.5, or 60 wt. %, of one or more sugars having fast or moderate dissolution rate, e.g., one or more monosaccharides or disaccharides disclosed herein. In one aspect, a particle matrix includes 10 wt. % to 30 wt. %, e.g., at least, at most, exactly, or between any two of 10, 12.5, 15, 17.5, 20, 22.5, 25, 27.5, or 30 wt. %, of one or more slow-dissolving low solubility sugars, e.g., one or more polysaccharides disclosed herein. In one aspect, a particle matrix includes 1 wt. % to 20 wt. %, e.g., at least, at most, exactly, or between any two of 1, 2.5, 5, 7.5, 10, 12.5, 15, 17.5, or 20 wt. %, of one or more sugars having fast or moderate dissolution rate, e.g., one or more monosaccharides or disaccharides disclosed herein. In one aspect, the combined wt. % of the one or more sugars in the particle matrix is 1-60 wt. %, e.g., at least, at most, exactly, or between any two of 1, 2.5, 5, 7.5, 10, 12.5, 15, 17.5, 20, 22.5, 25, 27.5, 30, 32.5, 35, 37.5, 40, 42.5, 45, 47.5, 50, 52.5, 55, 57.5, or 60 wt. %.

The flavored compositions can comprise one, two, three, or more pluralities of particles, where the combination and/or concentration of the one or more sugars of the particle matrix of one plurality of particles is different from the one or more sugars of each of the other of the particle matrices of each of the other pluralities of particles, and where the different combinations and/or concentrations of the one or more sugars results in each plurality of particles having a dissolution rate that is different from the dissolution rate of each of the other pluralities of particles. For example, in a flavored composition including a first plurality of particles, a second plurality of particles, and a third plurality of particles, the solubility or dissolution rate of the one or more sugars of the particle matrix of the first plurality of particles can be higher than the solubility dissolution rate of the one or more sugars of the particle matrix of the second plurality of particles and the particle matrix of the third plurality of particles, resulting in the first plurality of particles having a dissolution rate that is faster than the dissolution rate of the second plurality of particles and the third plurality of particles. Further, the solubility dissolution rate of the one or more sugars of the particle matrix of the third plurality of particles can be lower than the solubility dissolution rate of the one or more sugars of the particle matrix of the first plurality of particles and higher than the solubility dissolution rate of the one or more sugars of the particle matrix of the second plurality of particles, resulting in the third plurality of particles having a dissolution rate that is faster than the dissolution rate of the second plurality of particle but slower than the first plurality of particles.

Accordingly, in some aspects, the dissolution rate of the one or more sugars in the particle matrix of the first matrix is higher than the dissolution rate of the one or more sugars of the second matrix and the one or more sugars of the third matrix. In some aspects, the dissolution rate of the one or more sugars of the second matrix is lower than the dissolution rate of the one or more sugars of the first matrix and the sugars of the third matrix. In some aspects, the dissolution rate of the one or more sugars of the third matrix is lower than the dissolution rate of the sugars of the first matrix and higher than the dissolution rate of the one or more sugars of the second matrix.

The flavored compositions can comprise one, two, three, or more pluralities of particles, where the combination and/or concentration of the one or more food safe polymers, e.g., one or more hydrocolloids, and/or the one or more sugars of the particle matrices can be selected or modified such that the particle matrix of one plurality of particles is different from the particle matrices of each of the other pluralities of particles, where the different combinations and/or concentrations of the one or more food safe polymers, e.g., one or more hydrocolloids, and/or the one or more sugars results in each plurality of particles having a dissolution rate that is different from the dissolution rate of each of the other pluralities of particles. Non-limiting examples of various food safe polymer and sugar combinations that can provide particle matrices having different dissolution rates include: one or more high solubility food safe polymers and one or more high solubility sugars; one or more low solubility food safe polymers and one or more low solubility sugars; one or more moderate solubility food safe polymers and one or more moderate solubility sugars; one or more high solubility food safe polymers and one or more low solubility sugars; one or more low solubility food safe polymers and one or more high solubility sugars; one or more moderate solubility food safe polymers and one or more low solubility sugars; one or more low solubility food safe polymers and one or more moderate solubility sugars; one or more high solubility food safe polymers and one or more moderate solubility sugars; and one or more moderate solubility food safe polymers and one or more high solubility sugars, where, in each of the foregoing examples, a high solubility material has a dissolution rate that is faster than the dissolution rate of a moderate solubility material and the dissolution rate of a low solubility material, and a low solubility material has a dissolution rate that is slower than the dissolution rate of a high solubility material and a moderate solubility material.

In each of the foregoing non-limiting examples, the concentration of the high, moderate, and low solubility food safe polymers and/or sugars can be adjusted as necessary to achieve a desired particle matrix solubility or dissolution rate, with typical particle matrices including 30-85 wt. %, e.g., at least, at most, exactly, or between any two of 30, 32.5, 35, 37.5, 40, 42.5, 45, 47.5, 50, 52.5, 55, 57.5, 60, 62.5, 65, 67.5, 70, 72.5, 75, 77.5, 80, 82.5, or 85 wt. %, or 0.1-60 wt. %, e.g., at least, at most, exactly, or between any two of 0.1, 1, 2.5, 5, 7.5, 10, 12.5, 15, 17.5, 20, 22.5, 25, 27.5, 30, 32.5, 35, 37.5, 40, 42.5, 45, 47.5, 50, 52.5, 55, 57.5, or 60 wt. % as the combined wt. % of the one or more food safe polymers, e.g., one or more hydrocolloids, and 1-60 wt. %, e.g., at least, at most, exactly, or between any two of 1, 2.5, 5, 7.5, 10, 12.5, 15, 17.5, 20, 22.5, 25, 27.5, 30, 32.5, 35, 37.5, 40, 42.5, 45, 47.5, 50, 52.5, 55, 57.5, or 60 wt. %, as the combined wt. % of the one or more sugars.

For example, the matrix of each particle in a plurality of particles can include 30 wt. % to 50 wt. %, e.g., at least, at most, exactly, or between any two of 30, 32.5, 35, 37.5, 40, 42.5, 45, 47.5, and 50 wt. %, of a fast-dissolving food safe polymer, and 40 wt. % to 60 wt. %, e.g., at least, at most, exactly, or between any two of 40, 42.5, 45, 47.5, 50, 52.5, 55, 57.5, or 60 wt. %, of a sugar having a moderate dissolution rate.

As a second example, a matrix of each particle in a plurality of particles can include 30 wt. % to 50 wt. %, e.g., at least, at most, exactly, or between any two of 30, 32.5, 35, 37.5, 40, 42.5, 45, 47.5, and 50 wt. %, of a food safe polymer having a moderate dissolution rate, 15 wt. % to 35 wt. %, e.g., at least, at most, exactly, or between any two of 15, 17.5, 20, 22.5, 25, 27.5, 30, 32.5, or 35 wt. %, of a slow-dissolving food safe polymer, and 10 wt. % to 30 wt. %, e.g., at least, at most, exactly, or between any two of 10, 12.5, 15, 17.5, 20, 22.5, 25, 27.5, or 30 wt. %, of a sugar having a moderate dissolution rate.

As a third example, the matrix of each particle in a plurality of particles can include 65 wt. % to 85 wt. %, e.g., at least, at most, exactly, or between any two of 65, 67.5, 70, 72.5, 75, 77.5, 80, 82.5, or 85 wt. %, of a food safe polymer having a moderate dissolution rate, and 1 wt. % to 20 wt. %, e.g., at least, at most, exactly, or between any two of 1, 2.5, 5, 7.5, 10, 12.5, 15, 17.5, or 20 wt. %, of a fast-dissolving sugar.

As a fourth example, the matrix of each particle in a plurality of particles can include 40 wt. % to 60 wt. %, e.g., at least, at most, exactly, or between any two of 40, 42.5, 45, 47.5, 50, 52.5, 55, 57.5, or 60 wt. %, of a slow-dissolving food safe polymer, 0.1 wt. % to 10 wt. %, e.g., at least, at most, exactly, or between any two of 0.1, 1, 2, 3, 4, 5, 6, 7, 8, 9, or 10 wt. %, of a fast-dissolving food safe polymer, and 40 wt. % to 60 wt. %, e.g., at least, at most, exactly, or between any two of 40, 42.5, 45, 47.5, 50, 52.5, 55, 57.5, or 60 wt. %, of a fast-dissolving sugar.

In the foregoing examples, the dissolution rate of the plurality of particles of the first example would be higher than the dissolution rate of the plurality of particles in the second example and the dissolution rate of the plurality of particles in the third example, and the dissolution rate of the plurality of particles in the third example would be lower than the dissolution rate of the plurality of particles of the first example but higher than the dissolution rate of the plurality of particles of the second example. The dissolution rate of the plurality of particles in the fourth example would be lower than the dissolution rate of the plurality of particles of the first, second, and third examples.

B. Flavoring Agents

Each particle in the plurality of particles disclosed herein further comprises a flavoring agent. The flavoring agent can be encapsulated by or uniformly dispersed in the matrix, and the flavoring agent and the matrix are homogenous. The flavoring agent is not comprised in a core within the matrix. Additionally or alternatively, in some aspects, the matrix and flavoring agent are not layered together or with an additional matrix material. Additionally or alternatively, in some aspects, the matrix and/or flavoring agent are not coated by an additional matrix material.

In some aspects, the flavoring agent may be in the form of oil, aqueous solution, non-aqueous solution, or an emulsion. In some aspects, flavor essences, i.e., the water-soluble fraction derived from spices, herbs, fruits, citruses, and botanicals, can be utilized. The flavor and taste of products can be important, as they determine the overall consumer acceptability of the finished product. One of skill in the art would understand flavoring properties to select the appropriate flavorings for the food product.

The flavoring agent can comprise one or more flavors. Non-limiting examples of flavors include flavors derived from spices, herbs, fruits, citruses, and botanicals, e.g., ajowan, alexanders, allspice, almond, aloe, angelica, anise, anise-pepper, annatto, apple, apricot, areca nut, arnica, asafoetida, avens, avocado, balm, banana, basil, bay, bergamot, blackberry, black pepper, blueberry, borage, boysenberry, calamint, candlenut, cantaloupe, caper, capsicum, caraway, cardamom, cassia, catmint, celery, chamomile, garden chervil, cherry, chicory, chive, cinnamon, citron, clary, clementine, clove, cocoa, coconut, coffee, cola, coriander, costmary, cranberry, cress, cumin, curry leaf, date, dill, dragon fruit, elderberry, eucalyptus, fennel, fenugreek, fig, galangal, garlic, garlic mustard, ginger, grains of paradise, goji berry, gooseberry, grape, grapefruit, guava, honeydew, hop, hyssop, juniper, kiwi, kumquat, leek, lemon, lemon grass, licorice, lime, lovage, lychee, mace, malt, marjoram, mango, mint, dried edible mushrooms, mustard, nutmeg, onion, orange, oregano, paprika, papaya, passion fruit, parsley, peach, pear, pepper, peppermint, pineapple, plum, pomegranate, poppy, raspberry, rose hips, rosemary, saffron, sage, samphire, sarsaparilla root, sassafras bark, sesame, spearmint, star anise, star fruit, strawberry, tangerine, tamarind, tarragon, thyme, turmeric, vanilla, watermelon, hydrolyzed vegetable protein (HVPs), meat protein hydrolysates, milk protein hydrolysates; and compounded flavors both natural and artificial including those disclosed in S. Heath, Source Book of Flavors, Avi Publishing Co. Westport, Conn., pp. 149-277, 1981, which is incorporated herein by reference. Any one or more of the foregoing flavors may be excluded from the flavored compositions disclosed herein.

Additional non-limiting examples of flavors include one or more tastants that produce sweet, sour, bitter, salty, and umami tastes. Non-limiting examples of tastants that produce a sweet taste include natural sweeteners (e.g., sucrose, glucose, fructose, galactose, dextrose, lactose, maltose, honey, agave nectar, stevia), artificial sweeteners (e.g., aspartame, saccharin, sucralose), and other chemical compounds like aldehydes and ketones. Non-limiting examples of tastants that produce a sweet taste include organic acids (e.g., lactic acid, citric acid, malic acid, acetic acid, fumaric acid, tartaric acid) and inorganic acids (e.g., hydrochloric acid, nitric acid, sulfuric acid, phosphoric acid). Non-limiting examples of tastants that produce a bitter taste include alkaloids, terpenoids, saponins, caffeine, oxalic acid, phenols (e.g., polyphenols, anthocyanins, flavonoids, catechins, glucosides, tannins, proanthocyanidins), glucosinolates, isothiocyanates, esters, lactones, ureas, thioureas, sulfimides, heterocyclic compounds, fatty acids, and some amino acids and peptides. Non-limiting examples of tastants that produce a salty taste include sodium, potassium, and magnesium salts. Non-limiting examples of tastants that produce an umami taste include amino acids, peptides, inosinic acids, and guanylic acids. Any one or more of the foregoing tastants may be excluded from the flavored compositions disclosed herein.

In one aspect, the combined wt. % of the one or more flavoring agents in each particle in a plurality of particles is 0.1-20 wt. %, e.g., at least, at most, exactly, or between any two of 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 wt. %.

C. Additional Components

The particles in the pluralities of particles disclosed herein or the flavored compositions including the pluralities of particles disclosed herein may further comprise one or more additional components. The one or more additional components may comprise one or more insoluble fibers, emulsifiers, anti-sticking or flow agents, plasticizers, or other minor processing aids as required. Sweeteners, food acids, salts, fragrances, diluents, fillers, preservatives, antioxidants, stabilizers, lubricants, and the like may also be employed herein if desired. Any one or more of the foregoing additional components may be excluded from the flavored compositions disclosed herein. When present, the wt. % of each of the one or more additional components can be 0.1% to 20% by weight, e.g., at least, at most, exactly, or between any two of 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, 5, 6, 7, 8, 9, 10, 11, 12, 13, 14, 15, 16, 17, 18, 19, or 20 wt. %.

In some aspects, the pluralities of particles disclosed herein may further comprise one or more insoluble fibers. Fibers can provide viscosity control for the melt in the extrusion process for producing the flavored particulate materials and can provide product integrity during cutting, drying, cooling, and storage. The insoluble fibers may be natural and can include apple fiber, blueberry fiber, citrus fiber, sugarcane fiber, oat fiber, wood fiber, cellulose fiber, microcrystalline cellulose fiber, cotton fiber, rice fiber, wheat fiber, or mixtures thereof. In specific aspects, the insoluble fibers are sugarcane fibers. Any one or more of the foregoing insoluble fibers may be excluded from the flavored compositions disclosed herein. When present, the combined wt. % of the one or more insoluble fibers in each particle in a plurality of particles can be 1-20 wt. %, e.g., at least, at most, exactly, or between any two of 1, 2, 3, 4, 5, 6, 7, 8, 9, 10, 11, 12, 13, 14, 15, 16, 17, 18, 19, or 20 wt. %.

Non-limiting examples of emulsifiers include, e.g., dextrin, carrageenan, gelatin, egg protein, whey protein, lecithin, guar gum, xanthan gum, gum Arabic, carboxymethylcellulose, polysorbates, mono- and diglycerides, fatty acids from vegetable oil or animal fat, ammonium phosphatides, magnesium stearate, sorbitan monostearate, acetic acid esters, lactic acid esters, polyglycerol esters, propylene glycol esters, sucrose fatty acid esters, or a combination thereof. Emulsifiers can prevent the separation of components, which can improve the texture, shelf life, and quality of the flavored particulate materials disclosed herein. One of skill in the art would understand these emulsifier properties to select the appropriate emulsifiers for the flavored particles and flavored particulate compositions. Any one or more of the foregoing emulsifiers may be excluded from the flavored compositions disclosed herein.

Anti-sticking or flow agents can include magnesium, sodium, and potassium salts of fatty acids; silicon dioxide; titanium dioxide; calcium silicate; magnesium silicate; talc; sodium aluminum phosphate; calcium phosphate; magnesium carbonate; bentonite; sodium aluminosilicate; or combinations thereof. Anti-sticking or flow agents are powders with a low density that are spread thinly over the surface of particles or between them. They reduce the distance between particles, which reduces the Van der Waals forces of attraction and prevents particles from sticking together. They can also absorb moisture, which can prevent liquid bridges from forming on the surface of the particles. One of skill in the art would understand these properties and would select the appropriate anti-sticking or flow agents for the flavored particles and flavored particulate compositions. Any one or more of the foregoing anti-sticking or flow agents may be excluded from the flavored compositions disclosed herein. When present, the combined wt. % of the anti-sticking agents can be 0.1% to 1% by weight, e.g., at least, at most, exactly, or between any two of 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1 wt. %.

Plasticizers can include, e.g., water, ethanol, glycerin, propylene glycol, a carbohydrate solution, or mixtures thereof. Plasticizers can improve flexibility, prevent brittleness, improve durability, and prevent shrinking of food and beverage compositions. One of skill in the art would understand these plasticizer properties to select the appropriate plasticizer agents for the flavored particles and flavored particulate compositions. Any one or more of the foregoing plasticizers may be excluded from the flavored compositions disclosed herein. In some aspects, no plasticizer is needed to obtain a desired plasticizing effect. For example, if the amount of water, contained in the particle matrix materials or the flavored compositions is sufficient, no additional water or other plasticizer may be needed to be directly added to the composition during the mixing.

II. Methods of Making Flavored Compositions

Reference is now made to FIG. 1, which is a simplified flowchart of a method 100 for producing the flavored compositions including flavored particulate materials having different solubilities or dissolution rates disclosed herein. The method 100 can be a melt extrusion process in which a flavoring agent is encapsulated in a matrix to form the particles described herein.

In a first step 102, a matrix 104 including one or more food safe polymers, e.g., one or more hydrocolloids, and one or more sugars and a flavoring agent 106 are mixed. Optionally, additional components described elsewhere herein may be mixed with the matrix and flavoring agent. The individual components of the composition can be added either sequentially or at the same time, as long as all of the components are mixed and partially or completely melted prior to extrusion.

At step 108, the mixed matrix and flavoring agent are conveyed to an extruder assembly, where the matrix is melted to form a viscous dispersion of the flavoring agent, and the viscous dispersion is extruded through a die. The die can have multiple holes having or more shapes, e.g., spherical, nearly spherical, half-sphere, rod, cylindrical, football-shaped particles, star-shaped, heart-shaped, crescent moon-shape, flakes, disks, etc.

Figure 2A:
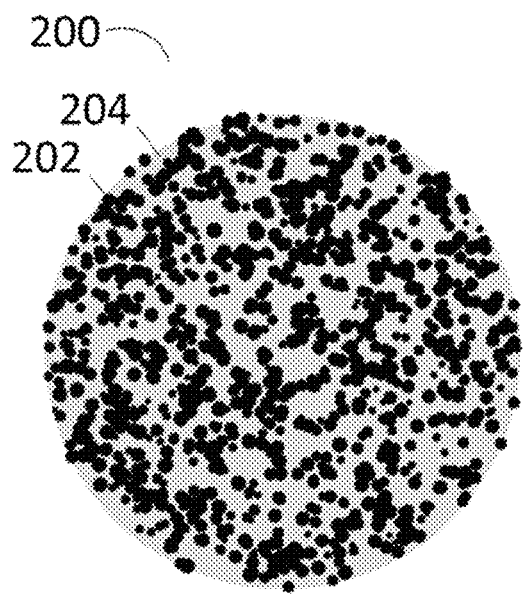
FIGS. 2A-2C are an illustration (FIG. 2A) and electron microscopy images (FIGS. 2B, 2C) of particles of a flavored composition produced according to the methods disclosed herein.
Figure 2B:
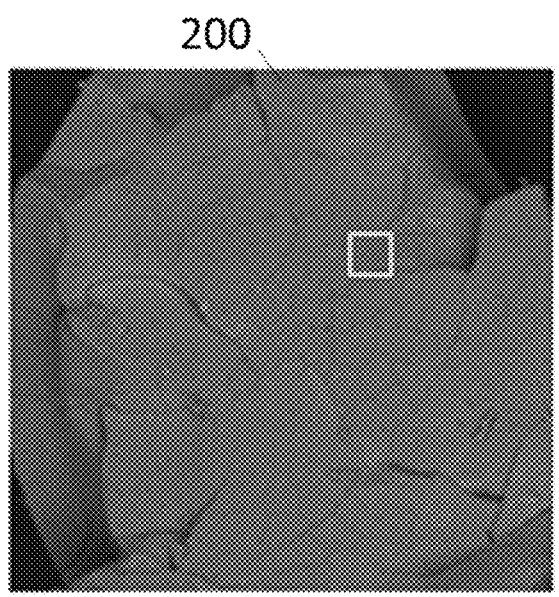
Figure 2C:
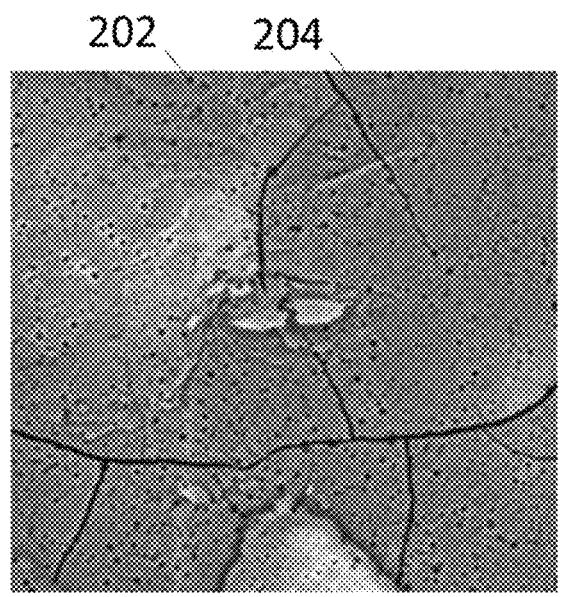

At step 110, the extruded material is cut to form the flavored particulate material, i.e., a plurality of particles, each of which includes a flavoring agent encapsulated in a matrix. For example, a rotating cutter knife can reduce strands of extruded material to particles. Depending on the linear speed of the extruded strands, rotating speed of the cutter, and the shape and size of the die holes, spherical, nearly spherical, half-sphere, rod, cylindrical, football-shaped particles, star-shaped, heart-shaped, crescent moon-shape, flakes, disks, etc. particles are formed. An illustration of an exemplary particle 200 produced according to method 100 is shown in FIG. 2A, in which particle 200 comprises flavoring agent 202 encapsulated by, i.e., uniformly dispersed, in matrix 204, where the flavoring agent and the matrix are homogenous, the flavoring agent is not comprised in a core within the matrix, the matrix and flavoring agent are not layered together or with an additional matrix material, and the matrix and/or flavoring agent are not coated by an additional matrix material. An electron microscope image of the surface of particle 200 produced according to method 100 is shown in FIG. 2B. FIG. 2C is a magnified portion of FIG. 2B showing encapsulation, or uniform dispersion, of flavoring agent 202 in the matrix 204.

At step 112, the flavored particulate material may be dried using, e.g., conventional dries such as fluidized bed driers, and at step 114, the dried flavored particulate material may be cooled, e.g., at ambient temperature.

Figure 3:
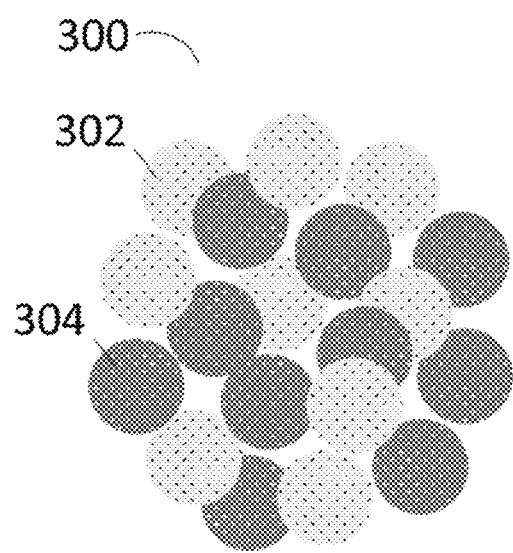
FIG. 3 is an illustration of a flavored composition comprising two or more flavored particulate materials produced according to the methods disclosed herein.

At step 116, the flavored particulate material may, after cutting, drying, or cooling, be mixed with another one or more flavored particulate materials, each of the flavored particulate materials having a flavor that is different than each of the other flavored particulate materials In this way, a flavored composition comprising two or more flavored particulate materials, i.e., two or more separate flavors, can be produced. An illustration of a flavored composition 300 comprising two or more flavored particulate materials produced according to method 100 is shown in FIG. 3, in which a first flavored particulate material 302 is homogenously mixed with a second flavored particulate material 304.

III. Flavor-Changing Products

A food or beverage product containing the flavored compositions including flavored particulate materials having different solubilities or dissolution rates disclosed herein is also described, including food or beverage products in which the flavored particulate materials are topically applied and/or mixed into the food or beverage products. The food or beverage products can include, but are not limited to, a powder, a paste, a liquid, a solid, a semi-solid, a purée, a chew, or a candy. Non-limiting examples of food or beverage products include cereals, crackers, cereal bars, snack chips, doughs and frozen doughs, bakery products (e.g., bread and muffins), seasonings, ice cream, meat products, dairy products, sauces, dry beverage blends, chewing gum, gummies, hard candies, and the like.

When used in such food or beverage products, the total weight of the flavored particulate materials, i.e., the combined weight of a first, second, third, or more plurality of flavored particles, can be 0.1 to 10%, e.g., at least, at most, exactly, or between any two of 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, 5, 6, 7, 8, 9, or 10 wt. %.

The food or beverage products optionally can include other ingredients in addition to the flavored particulate materials to the extent that these optional ingredients are edible and do not adversely affect the activity of the flavored particulate materials. For example, such optional ingredients should not impart an undesirable off-taste, off-color, off-odor, unpleasant mouthfeel, unpleasant smell, or gritty texture to the food or beverage.

In certain aspects, the food or beverage product containing the flavored compositions including flavored particulate materials having different solubilities or dissolution rates is a flavor changing food or beverage product. In some aspects, the combination and/or concentration of particle matrix components having different solubilities are selected or modified to provide differently flavored particulate materials having different dissolution rates. Accordingly, some flavored particulate materials having a high dissolution rate will dissolve faster in a food or beverage, while other flavored particulate materials having a low dissolution rate will dissolve slower in a food or beverage. The first particulate materials to dissolve will provide a first flavor, while the second or subsequent particulate materials to dissolve will provide a second or subsequent flavors.

For example, when flavored particulate materials are dissolved in a food or beverage, dissolution of a first flavored particulate material can provide a first flavor that predominates for a first time period $T_1$. After completion of $T_1$, dissolution of a second flavored particulate material can change the flavor the food or beverage (over a transitional or delay time $T_2$) to a second flavor that predominates for a third time period $T_3$. Time period $T_3$ may continue indefinitely (i.e., until the food or beverage is consumed) or may transition into additional flavors if desired and if further flavored particulate materials are included in the food or beverage product. For example, if a third flavor is desired, after $T_3$, dissolution of a third flavored particulate material can change the flavor the food or beverage (over a transitional or delay time $T_2$) to a third flavor that predominates for a time period $T_5$ until the food or beverage is consumed.

The number, nature, and duration of each sequential change in flavor as well as the length of the transitional periods can be modified as desired to achieve the desired organoleptic effect, but in some aspects, each of $T_1$, $T_2$, $T_3$, $T_4$, and $T_5$ are between 0 seconds and 30 minutes.

EXAMPLES

The following examples are provided merely for the purpose of explanation and are in no way to be construed as limiting the present disclosure. While the present invention has been described with reference to exemplary aspects, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials, and aspects, the present invention is not intended to be limited to the particulars disclosed herein; rather, the present invention extends to all functionally equivalent structures, methods and uses, such as are within the scope of the appended claims.

Matrix Blends

High solubility (HSM), medium solubility (MSM), and low solubility (LSM) matrix blends to which flavoring agents are added to provide the flavored compositions including flavored particulate materials having different dissolution rates disclosed herein are provided in Table 1.

TABLE 1

High, Medium, Low Solubility Matrix Blends

| Ingredient | Tradename | Supplier | LSM | MSM wt. % | HSM |
|---|---|---|---|---|---|
| Low solubility (slow-dissolving) hydrocolloid | C*EmCap ® corn starch | Cargill | 30-50 | | |
| Moderate solubility (moderate dissolution rate) hydrocolloid | Capsul ® corn starch | Ingredion | 15-35 | 65-85 | |
| High solubility (fast-dissolving) hydrocolloid | HI-CAP ® corn starch | Ingredion | | | 30-50 |
| Moderate solubility (moderate dissolution rate) sugar | Sucrose, Trehalose | | 1-20 | 40-60 | |
| High solubility (fast-dissolving) sugar | Dextrose | | | 1-20 | |
| Insoluble fiber | | | | 1-10 | 1-10 |

Non-limiting examples of products in which the matrix blends of Table 1 may be useful include cereals, crackers, cereal bars, snack chips, doughs and frozen doughs, bakery products (e.g., bread and muffins), seasonings, ice cream, meat products, dairy products, sauces, dry beverage blends, and the like.

A highly insoluble matrix blend to which flavoring agents are added to provide the flavored compositions including flavored particulate materials having different dissolution rates disclosed herein are provided in Table 2.

TABLE 2

Highly Insoluble Matrix Blend

| Ingredient | Trade Name | wt. % |
|---|---|---|
| Low solubility (slow-dissolving) hydrocolloid | Gum Arabic | 40-60 |
| High solubility (fast-dissolving) hydrocolloid | Tapioca starch | 0.1-5 |
| Sugar | | 40-60 |

The matrix blend of Table 2 may be useful, in some aspects, in products like chewing gum and gummies.

Flavored Composition Production

Matrix compositions according to Tables 1 and 2 above were dry blended and fed into the extruder assembly equipped with a 0.031" multi-orifice die. Water and flavoring agent were injected. The melt was extruded at a temperature in the range from about 145 to about 165° F. and die pressure from about 350 to about 650 psi (pounds per square inch). This resulted in glassy particles of 6.4% moisture (Karl-Fisher method), 49.0° C. midpoint glass transition temperature, and heat capacity change of 0.10 J/g/° C.

All of the methods and compositions disclosed and claimed herein can be made and executed without undue experimentation in light of the present disclosure. While the compositions and methods of this disclosure have been described in terms of certain aspects, it will be apparent to those of skill in the art that variations may be applied to the methods and in the steps or in the sequence of steps of the method described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

The invention claimed is:

1. A method of providing a sequential change in flavor of a food or beverage product, the method comprising:
   contacting an aqueous solution with:
   a plurality of first particles and a plurality of second particles;
   a plurality of first particles and a plurality of third particles;
   a plurality of second particles and a plurality of third particles; or
   a plurality of first particles, a plurality of second particles, and a plurality of third particles,
   wherein each of the plurality of first particles comprises:
   (a) a first matrix comprising one or more hydrocolloids and one or more sugars; and
   (b) a first flavoring agent,
   wherein the first matrix and the first flavoring agent define an outer surface of each of the plurality of first particles;

wherein each of the plurality of second particles comprises:
(a) a second matrix comprising one or more hydrocolloids and one or more sugars; and
(b) a second flavoring agent,
wherein the second matrix and the second flavoring agent define an outer surface of each of the plurality of second particles, and
wherein each of the plurality of third particles comprises:
(a) a third matrix comprising one or more hydrocolloids and one or more sugars; and
(b) a third flavoring agent,
wherein the third matrix and the third flavoring agent define an outer surface of each of the plurality of third particles,
wherein components of the first matrix are different from components of the second matrix and the third matrix, and components of the second matrix are different from components of the third matrix; and
dissolving the plurality of first particles and plurality of second particles, the plurality of second particles and plurality of third particles, the plurality of first particles and plurality of third particles, or the plurality of first particles, plurality of second particles, and plurality of third particles in the aqueous solution,
wherein dissolution of the plurality of first particles provides a first flavor, dissolution of the plurality of second particles provides a second flavor, and dissolution of the plurality of third particles provides a third flavor, and
wherein the plurality of first particles dissolves 5 seconds to 30 minutes before the plurality of second particles of the plurality of third particles, and the plurality of second particles dissolves 5 second to 30 minutes before the plurality of third particles.

2. The method of claim 1, wherein a dissolution rate of the plurality of first particles is higher than a dissolution rate of the plurality of second particles, and wherein a dissolution rate of the plurality of third particles is lower than the dissolution rate of the plurality of first particles and higher than the dissolution rate of the plurality of second particles.

3. The method of claim 2, wherein:
a dissolution rate of the one or more hydrocolloids of the first matrix is higher than a dissolution rate of the one or more hydrocolloids of the second matrix and a dissolution rate of the one or more hydrocolloids of the third matrix, and a dissolution rate of the one or more sugars of the first matrix is higher than a dissolution rate of the one or more sugars of the second matrix and a dissolution rate of the one or more sugars of the third matrix;
the dissolution rate of the one or more hydrocolloids of the second matrix is lower than the dissolution rate of the one or more hydrocolloids of the first matrix and the one or more hydrocolloids of the third matrix, and the dissolution rate of the one or more sugars of the second matrix is lower than the dissolution rate of the one or more sugars of the first matrix and the one or more sugars of the third matrix; and
the dissolution rate of the one or more hydrocolloids of the third matrix is lower than the dissolution rate of the one or more hydrocolloids of the first matrix and higher than the dissolution rate of the one or more hydrocolloids of the second matrix, and the dissolution rate of the one or more sugars of the third matrix is lower than the dissolution rate of the one or more sugars of the first matrix and higher than the dissolution rate of the one or more sugars of the second matrix.

4. The method of claim 1, wherein the food or beverage product is a powder, a paste, a liquid, a solid, a semi-solid, a purée, a chew, or a candy.

5. The method of claim 1, wherein:
the one or more hydrocolloids, one or more sugars, or a concentration of the one or more hydrocolloids or one or more sugars of the first matrix differs from the one or more hydrocolloids, one or more sugars, or a concentration of the one or more hydrocolloids or one or more sugars of the second matrix the one or more hydrocolloids, one or more sugars, or a concentration of the one or more hydrocolloids or one or more sugars of the third matrix; and
the one or more hydrocolloids, one or more sugars, or a concentration of the one or more hydrocolloids or one or more sugars of the second matrix differs from the one or more hydrocolloids, one or more sugars, or a concentration of the one or more hydrocolloids or one or more sugars of the third matrix.

6. The method of claim 1, wherein the first flavoring agent is uniformly dispersed in the first matrix, the second flavoring agent is uniformly dispersed in the second matrix, and/or the third flavoring agent is uniformly dispersed in the third matrix.

7. The method of claim 1, wherein each of the plurality of first particles, each of the plurality of second particles, and each of the plurality of third particles are unlayered.

8. The method of claim 1, wherein:
the first matrix comprises 30-50 wt. % of a fast-dissolving hydrocolloid and 40-60 wt. % of a sugar having moderate solubility;
the second matrix comprises 30-50 wt. % of a slow-dissolving hydrocolloid, 15-35 wt. % of a hydrocolloid having moderate solubility, and 10-30 wt. % of a sugar having moderate solubility; and
the third matrix comprises 65-85 wt. % of a hydrocolloid having moderate solubility and 1-20 wt. % of a fast-dissolving sugar.

9. The method of claim 1, wherein each of the first, second, and third flavoring agents are oil soluble.

10. The method of claim 1, wherein each of the first, second, and third flavoring agents are a natural extract, oleoresin, essential oil, protein hydrolyzate, reaction flavor, compounded flavor, or a mixture thereof.

11. The method of claim 1, wherein the first matrix, the second matrix, the third matrix, or a combination thereof further comprise one or more insoluble fibers.

12. The method of claim 11, wherein the second matrix and/or the third matrix comprise 1-10 wt. % of one or more insoluble fibers.

13. The method of claim 11, wherein the one or more insoluble fibers are sugarcane fiber, apple fiber, blueberry fiber, citrus fiber, oat fiber, wood fiber, cellulose fiber, cotton fiber, rice fiber, wheat fiber, or a combination thereof.

14. The method of claim 11, wherein:
the first matrix comprises 30-50 wt. % fast-dissolving starch and 40-60 wt. % sucrose;
the second matrix comprises 30-50 wt. % slow-dissolving starch, 15-35 wt. % of a starch having moderate solubility, 10-30 wt. % trehalose, and 1-10 wt. % insoluble fiber; and the third matrix comprises 65-85 wt. % of a starch having moderate solubility, 1-20 wt. % dextrose, and 1-10 wt. % insoluble fiber.

* * * * *